US009741670B2

(12) United States Patent
Charbonnier et al.

(10) Patent No.: US 9,741,670 B2
(45) Date of Patent: Aug. 22, 2017

(54) ELECTRONIC CHIP COMPRISING MULTIPLE LAYERS FOR PROTECTING A REAR FACE

(71) Applicant: Commissariat a L'Energie Atomique et aux Energies Alternatives, Paris (FR)

(72) Inventors: Jean Charbonnier, Grenoble (FR); Stephan Borel, Crolles (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 15/131,378

(22) Filed: Apr. 18, 2016

(65) Prior Publication Data
US 2016/0307855 A1    Oct. 20, 2016

(30) Foreign Application Priority Data
Apr. 20, 2015    (FR) ...................... 15 53505

(51) Int. Cl.
*H01L 23/00*    (2006.01)
(52) U.S. Cl.
CPC .......... *H01L 23/573* (2013.01); *H01L 23/576* (2013.01)
(58) Field of Classification Search
CPC .................................................. H01L 23/573
See application file for complete search history.

(56) References Cited

U.S. PATENT DOCUMENTS

| 5,369,299 A | 11/1994 | Byrne |
| 8,110,894 B2 * | 2/2012 | Savry ................... G06K 19/073 257/295 |
| 8,143,705 B2 * | 3/2012 | Van Geloven ........ H01L 23/576 257/48 |

(Continued)

FOREIGN PATENT DOCUMENTS

| DE | 100 65 339 A1 | 7/2002 |
| EP | 1 400 887 A1 | 3/2004 |

(Continued)

OTHER PUBLICATIONS

French Preliminary Search Report issued Mar. 9, 2016 in French Application 15 53505, filed Apr. 20, 2015 (with English Translation of Categories of Cited Documents).

(Continued)

*Primary Examiner* — Dung Le
(74) *Attorney, Agent, or Firm* — Oblon, McClelland, Maier & Neustadt, L.L.P.

(57) ABSTRACT

An electronic chip and a method of making thereof is provided, where the electronic chip includes at least: an electronic circuit arranged at a front face of a substrate; a first protective layer arranged on a rear face of the substrate; a resistive element arranged on the first protective layer and facing at least one part of the electronic circuit, mechanically supported by the first protective layer and connected electrically and/or in an inductive manner to the electronic circuit; a second protective layer covering at least the resistive element; and in which the first protective layer comprises at least one dielectric material having a resistance to chemical etching by at least one chemical etching agent less than or equal to that of a dielectric material of the second protective layer.

16 Claims, 17 Drawing Sheets

(56) References Cited

U.S. PATENT DOCUMENTS

2010/0026326 A1 2/2010 Bartley et al.
2010/0187527 A1 7/2010 Van Geloven et al.

FOREIGN PATENT DOCUMENTS

| FR | 2 872 610 A1 | 1/2006 |
| FR | 2 970 116 A1 | 7/2012 |
| WO | WO 2006/013302 A1 | 2/2006 |

OTHER PUBLICATIONS

European Search Report issued Dec. 7, 2016 in Patent Application No. 16165837.2 (with English translation of categories of cited documents).

* cited by examiner

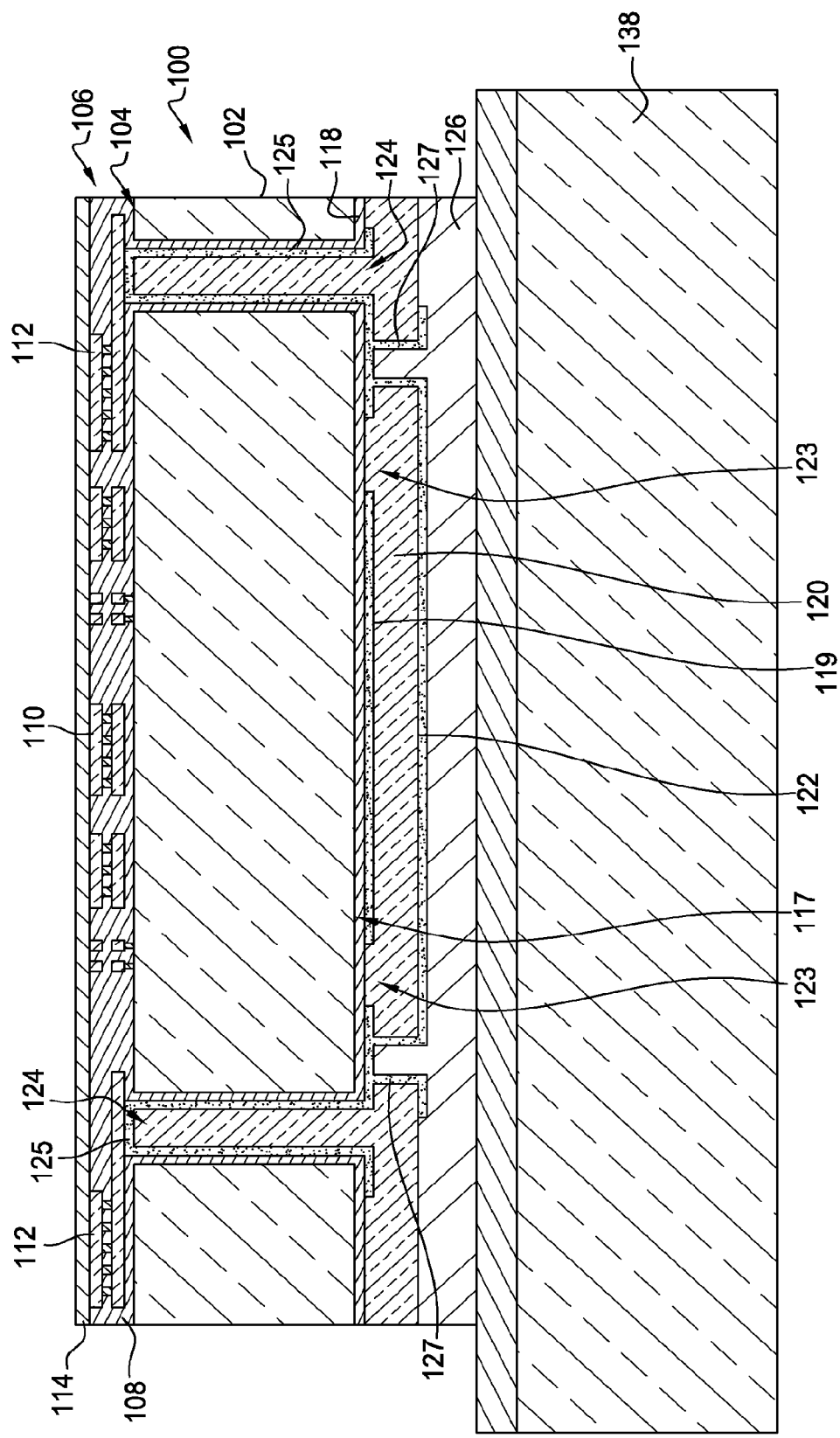

ELECTRONIC CHIP COMPRISING MULTIPLE LAYERS FOR PROTECTING A REAR FACE

TECHNICAL FIELD AND PRIOR ART

The invention relates to the field of security and the protection of electronic chips, and pertains to an electronic chip comprising means protecting the rear face of the electronic chip and making it possible to prevent access to the electronic circuit of the chip from its rear face. The invention applies to any type of electronic chip used notably in a chip card: mobile telephony chip, bank card, health card, identity document, etc.

Attacks that an electronic chip may undergo generally have the aim of accessing confidential data stored in the electronic circuit of the chip in order to clone it, to modify the information items stored, to wrongfully assume the identity of its holder, etc. An electronic chip may be attacked in multiple ways: chemical, physical, laser, electromagnetic, electric, etc.

The front face of an electronic chip, that is to say the face of the chip at which is located the electronic circuit, is generally protected by multiple means such as for example a protective layer protecting the chip against intrusive attacks by FIB (Focused Ion Beam) etching, as well as other protections against attacks by perturbation (glitch), by electromagnetic observation, or by cryptanalysis, etc.

Conversely, the rear face of the electronic chip is generally poorly protected. Without means for protecting this rear face, there is nothing to prevent the implementation of a thinning of the substrate of the chip at its rear face, or the production of electronic or electric failures by infrared laser (glitches), the silicon (which is the material generally used) of the substrate being transparent to wavelengths characteristic of the infrared. The access obtained to the electronic circuit of the chip then makes it possible to carry out for example a reading of the data via the obtaining of the encryption key.

Generally, only light detectors (photodiodes) made at the transistors of the circuit protect the chip towards laser attacks on the rear face in a more or less efficient manner depending on the case (the detection of an attack by these sensors must normally indicate that there has been intrusion in the chip by laser beam, which triggers the erasing of the data contained in the chip).

Access to secret information items of the electronic chips is achieved not only by perturbations by laser stimulation but also thanks to the production of contact pads of "probing" type directly connected to the inside of the electronic circuit, and does so thanks to the physical modification of the circuit by a focused ion beam (FIB).

The document DE 100 65 339 A1 describes the protection of a rear face of an electronic chip via the production of several capacitances at this rear face. In the case of alteration of the rear face of the chip linked to an attack, the change in the value of the capacitances is detected and an action, such as placing the chip in default mode, is then carried out. Such protection is nevertheless not suited for protecting the chip towards attacks by ion beam ablation. In fact, even with an optimised design, the sensitivity of the capacitances on the rear face is not sufficient on account of their very large total surface, and an alteration of these capacitances by ion beams is very difficult to detect. Typically, an attack by ion beam is carried out on an etching window of 50 μm sides, i.e. a surface area equal to $2.5 \cdot 10^{-3}$ mm$^2$. Considering a chip of standard size of surface equal to 4 mm$^2$, the etching window represents a variation of less than $\frac{1}{1000}$ of the surface of the chip.

The document U.S. Pat. No. 8,110,894 B2 describes an electronic chip of which the front face comprises an inductance which, by inductive coupling through the substrate of the chip, detects the presence of a conducting ground plane arranged on the rear face of the chip. An alteration by an attack of this conducting ground plane induces a variation in the inductive coupling between the front and rear faces of the chip, which leads to the chip being put into default mode.

This solution nevertheless offers a limited level of protection because such protection of the rear face of the chip is quite simple and the conducting metal plane is easy to copy.

The rear faces of these electronic chips thus require protection that is efficient against different possible attacks.

DESCRIPTION OF THE INVENTION

Thus there is a need to propose an electronic chip of which the rear face is efficiently protected towards different types of attack, notably towards attacks by thinning, by focused ion beam or by chemical etching of the rear face of the chip.

To do so, one embodiment proposes an electronic chip comprising at least:
- an electronic circuit arranged at a front face of a substrate;
- a first protective layer arranged on a rear face of the substrate;
- a resistive element arranged on the first protective layer and facing at least one part of the electronic circuit, mechanically supported by the first protective layer and connected electrically and/or in an inductive manner to the electronic circuit;
- a second protective layer covering at least the resistive element;

and in which the first protective layer comprises at least one dielectric material having a resistance to chemical etching by at least one chemical etching agent less than or equal to that of a dielectric material of the second protective layer.

The rear face of such an electronic chip is thus protected thanks to the resistive element coupled to the two protective layers.

If a mechanical thinning or polishing of the rear face of the electronic chip is implemented, this thinning necessarily causes, after the destruction of the second protective layer, that of the resistive element. This destruction of the resistive element then creates an open circuit which is detected by the electronic circuit of the chip which could, for example, place itself in default mode.

If a chemical etching is implemented with the aim of reaching the electronic circuit from the rear face of the chip, the chemical etching agent used to etch the substrate, for example a solution comprising KOH and/or TMAH and/or hydrofluoric acid and/or nitric acid, also destroys the two protective layers, and notably the first protective layer which mechanically supports the resistive element, because of the nature of the material(s) of these protective layers which also undergo the etching implemented to etch the substrate. This destruction of the protective layers thus also brings about a destruction of the resistive element which is no longer mechanically supported by the first protective layer, this destruction being detected by the electronic circuit of the chip.

During such a chemical etching, notably from the lateral walls of the protective layers, the first protective layer is thus etched chemically even if the second protective layer is more difficult to attack by the etching agent used. Due to the fact that the dielectric material of the first protective layer has an etching resistance less than or equal to that of the dielectric material of the second protective layer, the first protective layer is etched more rapidly than the second protective layer (or at the same speed when the two protective layers are of same nature), which implies that a detection of the intrusion or the attack takes place (via the destruction of the resistive element which is no longer mechanically supported) before the resistive element can be reached and modified by this etching from the second protective layer. Moreover, chemical attack of the first protective layer generally brings about the elimination of at least one part of the second protective layer.

Advantageously, the first protective layer may be thinner, or less thick, than the second protective layer.

The resistance to chemical etching may be quantified by the speed of attack, or etching, or dissolution, of the material in μm/min for an aqueous solution or a given chemical corresponding to the chemical etching agent. This speed may be measured by the measurement of the thickness of a layer before and after its exposure to the chemical etching agent for a determined duration. The ratio of the difference in thickness measured to the duration gives the speed of attack.

Finally, the dielectric material of the protective layers makes attacks by focused ion beam difficult. In fact, when the dielectric material of the protective layers is subjected to an ion beam, these ions accumulate in the dielectric material at the spot targeted by the beam, which creates a localised electrical charge which leads to a shift of the ion beam. The ablation of the material then becomes very difficult or even impossible because the ion beam deviates and does not manage to penetrate in depth into the dielectric material to reach the electronic circuit. Moreover, even if a high energy ion beam is used to go through the dielectric material of the protective layers, this ion beam then damages the resistive element, thereby modifying its electrical resistance and thus triggering a detection of this attack by the electronic circuit of the chip.

It is thus proposed an electronic chip comprising on the rear face a combination of an active protection structure (the resistive element) and a passive protection structure (the protective layers) while making this protection system totally opaque towards an attack of the rear face of the electronic chip.

The part of the electronic circuit facing the resistive element may be any part of the electronic circuit, and notably an electrical routing part, or an active zone comprising for example at least one transistor and/or at least one memory.

At least the dielectric material of the second protective layer may be resistant to mechanical polishing and/or opaque towards infrared radiation and/or resistant to attack by focused ion beam.

The choice of a dielectric material which is opaque towards infrared radiation forms an additional protection towards attacks by infrared radiation, for example by infrared laser. The expression "opaque towards infrared radiation" designates for example a material having a coefficient of transmission less than around 20% towards infrared radiation. The expression "resistant to attack by focused ion beam" designates for example a material of which the speed of abrasion by the focused ion beam is less than around 0.5 μm/min for an attack window of dimensions 50×50 μm$^2$.

At least the dielectric material of the second protective layer may have a Young's modulus greater than or equal to around 1 GPa. Such a Young's modulus confers good resistance towards mechanical polishing or mechanical thinning.

The dielectric material of the first protective layer and/or the dielectric material of the second protective layer may be a non-mineral material and/or a polymer and/or may comprise epoxy and/or may comprise silicone. The choice of such materials to produce the protective layers is advantageous because they make it possible to produce easily the protective layers on either side of the resistive element.

The first protective layer and/or the second protective layer may further comprise particles of a first material different to the dielectric material of the first protective layer and/or the dielectric material of the second protective layer, and which are spread out in the whole of the dielectric material of the first protective layer and/or the dielectric material of the second protective layer. Such particles may notably form an additional protection towards etching by FIB of the protective layer(s) which comprise these particles. This protection towards etching by FIB may be obtained thanks to the considerable hardness of the first material of the particles (for example alumina having a Vickers hardness of the order of 1500 kgf·mm$^{-2}$), this hardness being for example greater than or equal to 100 kgf·mm$^{-2}$. The first material may also be such that the particles perturb a laser beam used on the protective layer(s) which comprise these particles.

Such particles may also be added in the material of one of the protective layer or in materials of both protective layers when this or these materials are dielectric materials which are not polymers.

In addition, the first material of the particles may be covered with a second reflective material towards light and/or electronic and/or ionic radiation, for example a metal material. This reflective coating makes it possible to perturb even more a light (for example laser) and/or electronic and/or ionic (FIB) beam which could be applied to the dielectric material of the protective layers. These reflective particles are advantageously used for the second protective layer which has a free face forming the rear face of the electronic chip. The second material may be qualified as reflective when it reflects at least 50% of the light and/or electronic and/or ionic radiation.

The resistive element may comprise at least one conducting track having at least one serpentine pattern and/or several alternating, entangled, wound up or intertwined patterns. Such a configuration of the resistive element makes it possible to make difficult or even prevent the production of a metallic bridge or a short-circuit between two parts of the resistive element ("wire bypass") with the aim of accessing the part of the rear face located between these two parts of the resistive element without modifying the value of the electrical resistance of the resistive element. Generally speaking, the pattern of the resistive element may cover at the maximum the first protective layer, and covers for example all the part of the first protective layer located facing the part of the electronic circuit on the face of which is located the resistive element to detect as best as possible an attack on the rear face of the electronic chip.

In addition, the conducting track may have a width comprised between around 5 μm and 50 μm, and/or portions of the conducting track which are next to and parallel to each other may be spaced apart by a distance comprised between around 5 µm and 50 µm. Such a configuration of the resistive element thus leaves too little space for an attack by an FIB beam without it causing an important modification of the value of the electrical resistance of the resistive element.

The electronic chip may further comprise an electrically conducting layer arranged between the rear face of the substrate and the first protective layer. Such an electrically conducting layer forms an additional protective screen towards laser beam and/or other electromagnetic radiations which may be used to attack the rear face of the electronic chip. For the deposition of this electrically conducting layer, the rear face of the substrate may be electrically insulating or made electrically insulating by the prior deposition of an electrically insulating layer on this rear face.

The electronic chip may further comprise an inductive element arranged at the front face of the substrate and electrically connected to the electronic circuit, and the resistive element may form part of a RLC circuit (that is to say an electric circuit having an electrical resistance, an inductance and a capacitance) capable of being coupled in an inductive manner with said inductive element such that a modification of a value of an inductance of the inductive element induces a modification of an electrical property of the RLC circuit. Thus, the resistive element is connected to the electronic circuit in an inductive manner without resorting to conducting vias made through the substrate.

In addition, the resistive element may form a coil of which the ends are electrically connected to each other. According to an advantageous embodiment, the electrically conducting layer arranged between the rear face of the substrate and the first protective layer may electrically connect the ends of the coil.

The electronic chip may further comprise at least one second via and/or a trench made through the rear face of the substrate and a part of the thickness of the substrate, and arranged at least facing the electronic circuit such that a bottom wall of the second via and/or the trench is spaced apart from the electronic circuit by a non-zero distance. This or these second vias and/or trenches which are not completely made through the substrate form in the substrate a mechanical weakening structure conferring an additional protection towards mechanical thinning or polishing of the chip from its rear face, as well as towards attack by FIB or by chemical etching of the rear face of the chip. Advantageously the lateral walls and the bottom wall of the second via and/or the trench may be covered by the electrically conducting layer arranged on the rear face of the substrate.

Another embodiment concerns a method for producing an electronic chip comprising at least the steps of:
  producing an electronic circuit at a front face of a substrate;
  producing a first protective layer on a rear face of the substrate;
  producing a resistive element on the first protective layer and facing at least one active part of the electronic circuit, the resistive element being mechanically supported by the first protective layer and connected electrically and/or in an inductive manner to the electronic circuit;
  producing a second protective layer covering at least the resistive element;
  in which the first and second protective layers each comprise at least one dielectric material, and in which a material of the substrate and the dielectric material are capable of being chemically etched by at least one same etching agent.

BRIEF DESCRIPTION OF THE DRAWINGS

The present invention will be better understood on reading the description of embodiment examples given purely for indicative purposes and in no way limiting and by referring to the appended drawings in which.

Identical, similar or equivalent parts of the different figures described hereafter bear the same numerical references so as to make it easier to go from one figure to the next.

The different parts shown in the figures are not necessarily according to a uniform scale, in order to make the figures more legible.

The different possibilities (variants and embodiments) must be understood as not being mutually exclusive and may be combined together.

DETAILED DESCRIPTION OF PARTICULAR EMBODIMENTS

Figure 1:
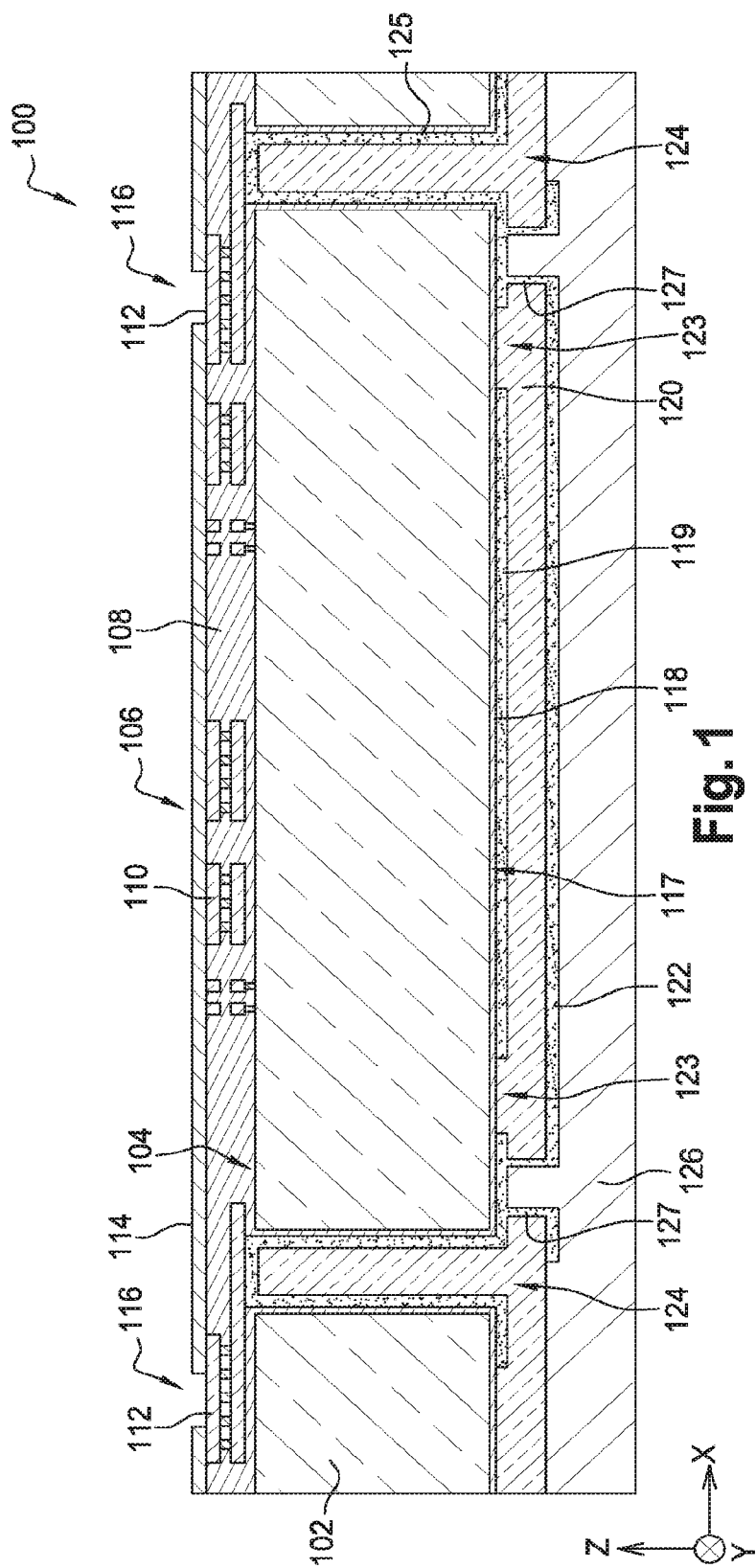
FIG. 1 shows a sectional view of an electronic chip according to a first embodiment.

Reference is firstly made to FIG. 1 which shows a sectional view of an electronic chip 100 according to a first embodiment.

The electronic chip 100 comprises a substrate 102, comprising for example of a semi-conductor material such as silicon, of which the thickness is generally equal to around 180 µm in the case of an electronic chip 100 of a chip card. The substrate 102 comprises a front face 104 on which is produced an electronic circuit 106. The electronic circuit 106 is made in a dielectric layer 108 comprising for example $SiO_2$, and includes notably an active part 110 comprising electronic components and intended to be protected from potential attacks of the electronic chip 100. The electronic circuit 106 also comprises peripheral parts here corresponding to contact pads 112 accessible from the front face of the electronic chip 100. The front face of the electronic chip 100 is formed by a passivation layer 114, corresponding for example to a bilayer of oxide and nitride such as $SiO_2$ and SiN, through which are made openings 116 to access the contact pads 112. A rear face 117 of the substrate 102 is covered with a dielectric layer 118 which includes for example a semiconductor oxide such as $SiO_2$, and/or SiN, for example deposited by PECVD (plasma enhanced chemical vapour deposition) and of thickness comprised between around 1 µm and 5 µm.

The electronic chip 100 also comprises means for protecting its rear face. These protection means here comprise:
  an electrically conducting layer 119 arranged on the dielectric layer 118, facing at least the active part 110 of the electronic circuit 106;
  a first protective layer 120 covering notably the continuous electrically conducting layer 119;
  a resistive element 122 arranged on the first protective layer 120 and which is electrically connected to the electronic circuit 106 through first conducting vias 124 which are made through the whole thickness of the substrate 102;

a second protective layer 126 covering notably the resistive element 122 and forming the rear face of the electronic chip 100.

The lateral walls of each first conducting via 124 are covered by parts of the dielectric layer 118. An electrically conducting layer 125 covers these parts of the dielectric layer 118 (which thus forms an insulation between this electrically conducting layer 125 and the substrate 102) as well as the bottom wall of each first conducting via 124 in order to form an electrical connection between the front and rear faces 104, 117 of the substrate 102. The electrically conducting layers 119 and 125 are derived from a same layer of electrically conducting material which corresponds for example to copper deposited by ECD (electrochemical deposition) with a thickness comprised between around 10 µm and 5 µm, and/or tungsten being able to be deposited by PVD (physical vapour deposition) with a thickness comprised between around 100 nm and 800 nm, and/or titanium. The electrically conducting layer 125 has a substantially constant thickness and thus does not completely fill the volume of the first conducting vias 124. The remainder of the volume of the first conducting vias 124 is here filled by the dielectric material of the first protective layer 120. The electrically conducting layers 119 and 125 are electrically insulated from each other by etching the parts of the layer deposited from which are derived the layers 119 and 125 (see the insulation regions 123 visible in FIG. 1 and made by etching the layer from which are derived the layers 119 and 125).

The diameters of the first vias 124 are for example of the order of 80 µm.

The resistive element 122 is for example made by an ECD or PVD deposition of copper or aluminium and of thickness comprised between around 10 µm and 20 µm, and advantageously comprised between around 10 µm and 10 µm. The resistive element 122 is electrically connected to the electrically conducting layers 125 of the first conducting vias 124 by conducting portions 127, for example comprising copper or aluminium, made through the first protective layer 120.

The thickness (dimension along the Z axis) of the stack comprising the substrate 102, the electronic circuit 106 and the passivation layer 114 is for example less than or equal to around 200 µm.

The protective layers 120 and 126 comprise a dielectric material, and advantageously correspond to layers of polymer. The thicknesses of the protective layers 120 and 126 are for example comprised between around 3 µm and 50 µm. Advantageously, the polymer is chosen among materials having a Young's modulus making mechanical thinning and/or polishing of the electronic chip 100 from its rear face difficult, for example comprised between around 1 and 10 GPa. Such a material is advantageously used at least for the second protective layer 126. The materials of the protective layers 120, 126 may have a coefficient of thermal expansion comprised between around 10 and 100, and may have a glass transition temperature comprised between around 100° C. and 200° C.

In addition, the materials of the protective layers 120, 126 are dielectric materials, which makes it possible to counter attacks of the electronic chip 100 by FIB by virtue of the phenomenon of accumulation of charges taking place in such a dielectric material, which brings about a shift of the ion beam and prevents the etching of these protective layers 120, 126.

The materials of the protective layers 120, 126 are also chosen as a function of the nature of the material of the substrate 102, such that an etching agent typically used to chemically etch the substrate 102 also etches the materials of the protective layers 120, 126. These materials are chosen such that that of the first protective layer 120 has a resistance to chemical etching which is less than or equal to that of the material of the second protective layer 126. Thus, during such chemical etching, the first protective layer 120 is necessarily etched even if the second protective layer 126 is not totally etched. The first protective layer 120 is etched more rapidly than the second protective layer 126 (or at the same speed when the two protective layers 120, 126 are of same nature), which implies that a detection of the intrusion or the attack takes place (via the destruction of the resistive element 122 which is no longer supported mechanically) before the resistive element 122 can be reached thanks to the etching of the second protective layer 126.

Advantageously, particles, called "fillers", which are typically made of silica or alumina, are dispersed in the dielectric materials of the protective layers 120, 126. Such particles hinder etching of the protective layers 120, 126 by FIB. In addition, such particles also perturb a laser beam which could be used in the case of laser attacks of the electronic chip 100. These particles may be advantageously covered with metal, for example tungsten and/or titanium, to better perturb attack by laser beam of the electronic chip 100. The diameters of these particles may be comprised between around 1 µm and 15 µm. The percentage of particles in the protective layers 120, 126 may be comprised between 0% (absence of these particles) and around 90%.

The dielectric materials of the protective layers 120, 126 are advantageously chosen such that they are opaque to all light signals of infrared and near infrared wavelength, that is to say of wavelength comprised between around 700 nm and 1 mm. Thus, it is impossible for the person carrying out an attack by infrared laser beam to visualise the electronic circuit 106 through the silicon of the substrate 102 and the protective layers 120, 126 to target the active part 110 of the electronic circuit 106 relevant for the attack.

Advantageously, the protective layers 120, 126 are produced from different dielectric materials each having complementary properties. For example, the first protective layer 120 may be produced with a first polymer which is opaque towards infrared laser beams, and the second protective layer 126 may be produced with a second polymer having a hardness greater than that of the first polymer and which is loaded with "fillers". This first polymer may comprise silicone, for example the polymer DF5770 distributed by the firm Shin-Etsu, and the second polymer may comprise epoxy resin, for example the polymer A2023 distributed by the firm Nagase.

In a variant, the second protective layer 126 may cover the sides, that is to say the lateral faces, of the electronic chip 100.

Generally speaking, the dielectric materials of the protective layers 120, 126 may be chosen such that they have one or more of the following properties:
  polymer comprising silicone or epoxy resin;
  appearance preferably black, or instead white or grey;
  preferably photosensitive, notably for the first protective layer 120;
  Young's modulus comprised between around 1 GPa to 10 GPa.

During the operation of the electronic chip 100, the electronic circuit 106 measures beforehand the value of the electrical resistance of the resistive element 122. If the value of this electrical resistance does not comply with the expected value, the data are then blocked and the electronic chip 100 is locked (placed in default mode). Thus, any attack of the electronic chip 100 from its rear face which brings about a rupture or a modification of the value of the resistance of the resistive element 122 is detected by the electronic chip 100, and the electronic chip 100 is blocked so as to destroy its functionality.

Figure 2:
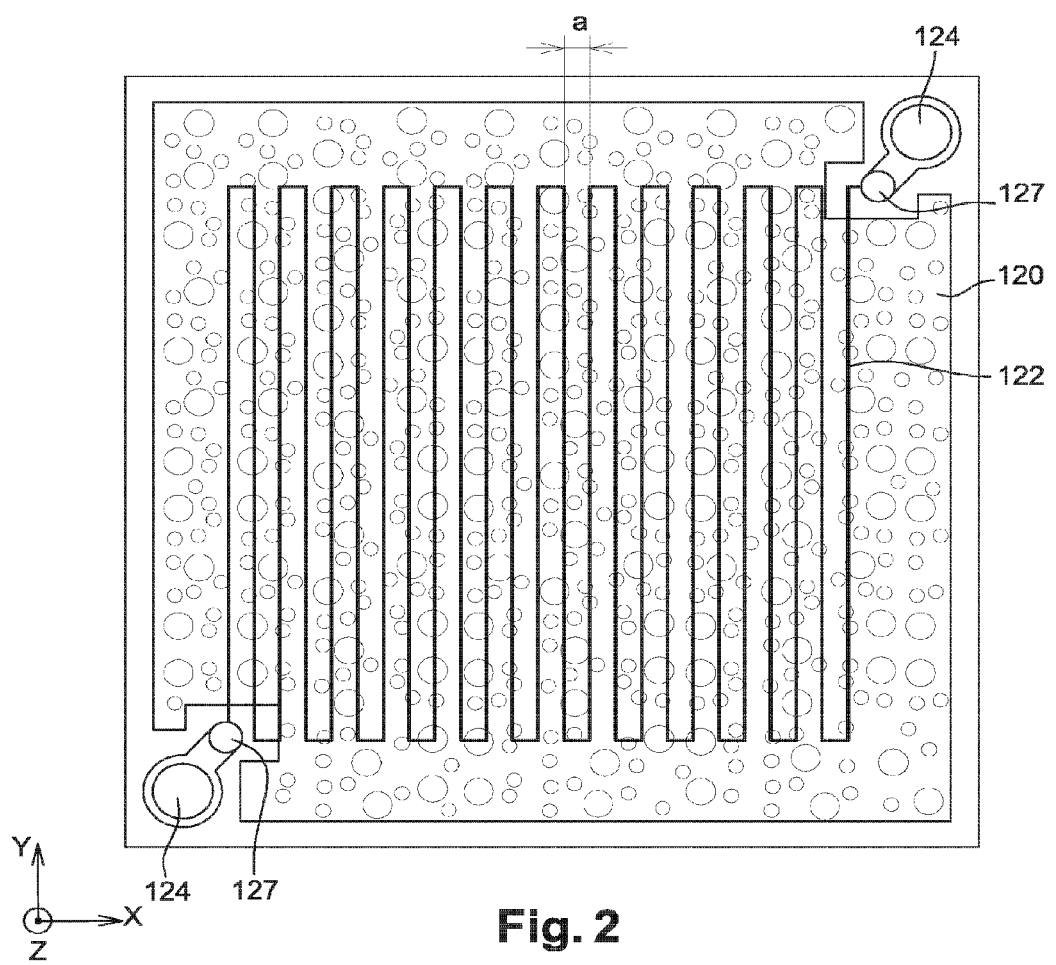
FIG. 2 shows a top view of the resistive element of the electronic chip.

FIG. 2 shows a top view of the resistive element 122. In the main plane of the electronic chip 100 corresponding to the plane (X,Y) in FIGS. 1 and 2, the resistive element 122 corresponds to a conducting track extending between the two first conducting vias 124 while having a serpentine pattern, which makes it possible to properly cover the surface located facing at least the active part 110 of the electronic circuit 106. In the example of FIG. 2, the pattern of the resistive element 122 covers practically all of the surface of the rear face of the electronic chip 100.

Advantageously, the width of the conducting track forming the resistive element 122 and the space between two parallel portions of the conducting track (distance referenced "a" in FIG. 2) are comprised between around 5 µm and 50 µm. Thus, an attack by FIB, typically carried out on a surface of the electronic chip 100 corresponding to a square of dimensions equal to 50 µm×50 µm, necessarily causes a considerable modification of the electrical resistance of the resistive element 122. In addition, a space of at least 5 µm between the different portions of the conducting track makes it possible to let an etching agent properly pass between these portions during a potential chemical attack of the rear face of the electronic chip 100, leading in this case to the destruction of the first protective layer 120 and thus also the destruction of the resistive element 122 which is no longer mechanically supported by it.

The pattern formed by the resistive element 122 at the rear face of the electronic chip 100 is advantageously chosen such that it is sufficiently dense and complex so that a "wire bypass", that is to say the production of a metallic bridge or a short-circuit between two parts of the resistive element 122, or instead the positioning of an equivalent resistance between the two first conducting vias 124, induces a significant variation in the resistance of the resistive element 122 which may be detected.

For example, in the case of a resistive element 122 corresponding to a serpentine formed by a conducting track made of copper of width equal to 25 µm, of thickness equal to 10 µm, with spaces between the portions next to the conducting track (dimension "a") equal to 25 µm and covering a surface of the chip equal to 2 mm², the electrical resistance of this resistive element 122 is equal to around 7Ω. In the case of pull off or cutting of the resistive element 122 by an FIB, the value of its electrical resistance becomes infinite. The sensitivity of such a resistive element 122 towards mechanical or chemical attack, or by FIB, is thus much better than for other solutions for protecting the rear face of the chip of the prior art.

In a variant, the pattern formed by the resistive element 122 may be different to a serpentine, and may correspond to several alternating, entangled, wound up or intertwined patterns in order to make this "wire bypass" operation very complicated.

The dielectric material of the first protective layer 120 is advantageously photosensitive in order to be able to be insolated then developed easily to form the emplacements of the conducting portions 127. This dielectric material is for example a vacuum laminated polymer, which makes it possible to properly fill the space of the first conducting vias 124 not occupied by the dielectric layer 118 and the electrically conducting layer 125.

The combination of the resistive element 122 and the protective layers 120, 126 makes it possible to optimise the two modes of protection conferred by these two elements. In fact, a chemical or mechanical attack which is the main limit of the protection conferred by only one protective layer comprising a polymer, is systematically detected thanks to the damage caused on the resistive element 122. In the case of a mechanical attack of the rear face of the electronic chip 100, this will pull off a part of the resistive element 122 and will create an open circuit between the first conducting vias 124 which will be detected by the electronic chip 100. In the case of chemical attack of the rear face of the electronic chip 100, this will remove the material of the protective layers 120, 126 surrounding the resistive element 122 and will cause a rupture of the resistive element 122 which in the same way will be detected by the electronic chip 100. Finally, a conventional attack by FIB will be impossible on the materials of the protective layers 120, 126 because they have an important resistance to etching by FIB thanks to their dielectric character. In addition, the alignment of the FIB is impossible in the case of opaque dielectric materials. The use of high energy FIB could enable with difficulty blind etching but after having gone through the material of the second protective layer 126, the FIB will necessarily damage the resistive element 122 and this attack will also be detected.

Figure 3:
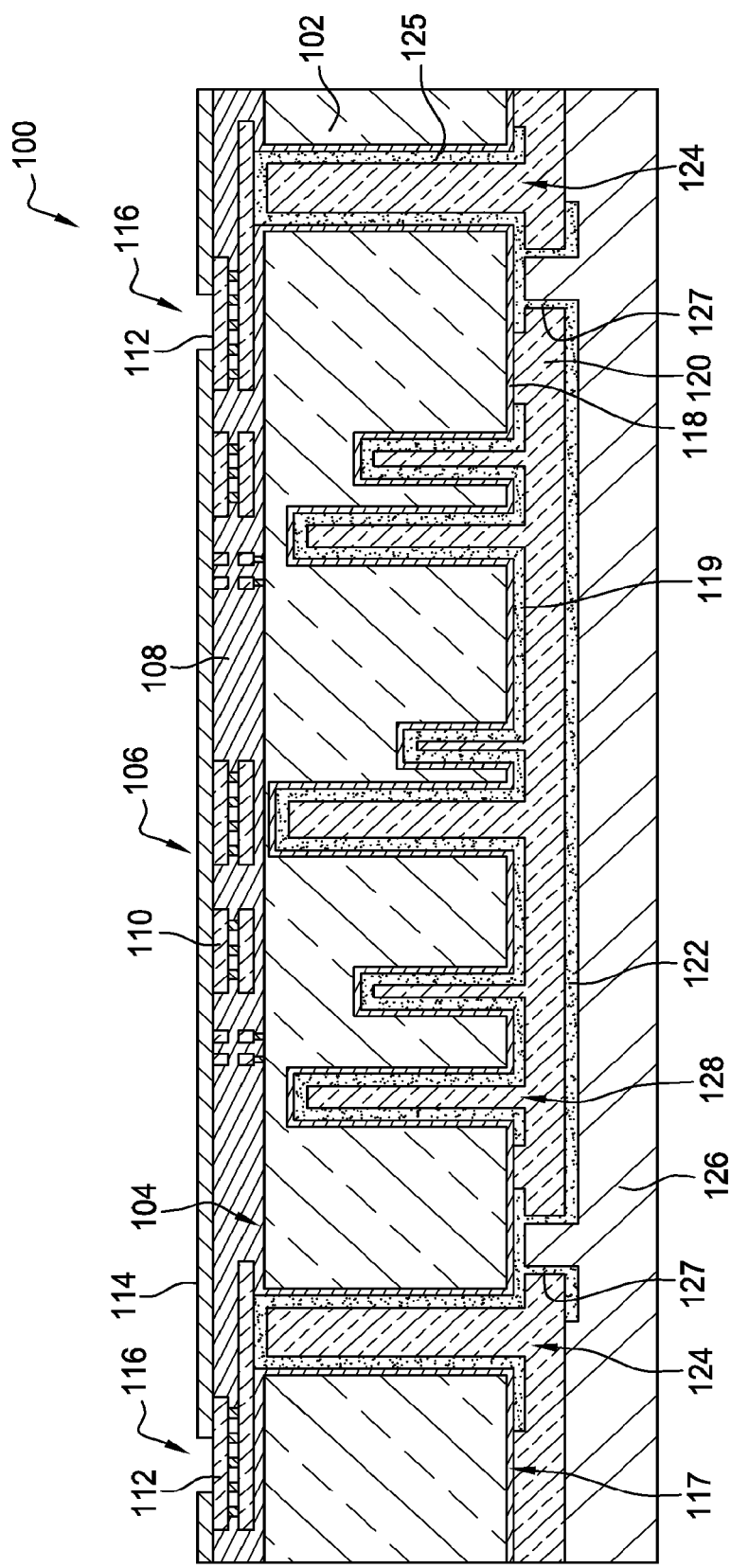
FIG. 3 shows a sectional view of an electronic chip according to a second embodiment.

FIG. 3 shows a sectional view of an electronic chip 100 according to a second embodiment.

In this second embodiment, apart from the first conducting vias 124 which electrically connect the resistive element 122 to the electronic circuit 106, the electronic chip 100 also comprises several second non-emerging vias 128 produced from the rear face 117 of the substrate 102 and through a part of the thickness of the substrate 102, facing the electronic circuit 106 and notably the active part 110.

The second vias 128 comprise depths (dimensions along the Z axis) and dimensions in a plane parallel to the main faces 104 and 117 of the substrate 102 (plane (X,Y)), corresponding to the diameters in the case of second vias 128 of substantially circular sections, advantageously different to each other, and for example chosen in a random manner during their production. The depths of the second vias 128 are linked to the diameters of the second vias 128, and are chosen notably as a function of the thickness of the substrate 102. The second vias 128 advantageously have diameters less than around 80 µm and depths less than around 200 µm. Moreover, due to the fact that, unlike the first conducting vias 124, the second vias 128 are made through only a part of the thickness of the substrate 102, the diameters of the second vias 128 are less than those of the first conducting vias 124.

The lateral walls and the bottom walls of the second vias 128 are covered by the dielectric layer 118. The electrically conducting layer 119 here covers in a continuous manner the dielectric layer 118 at the lateral walls and the bottom walls of the vias 128, as well as at a part of the rear face 117 of the substrate 102, notably between the second vias 128.

The presence of second vias 128 at the rear face of the electronic chip 100 forms a mechanical weakening structure of the substrate 102 making it possible to protect the electronic chip 100 towards chemical attacks and/or attacks by FIB etching. In fact, the bottom walls of the second via(s) 128 are advantageously close to the electronic circuit 106, for example such that the distance separating the electronic circuit 106 of the bottom wall(s) is less than or equal to around 20 µm, or for example comprised between around 10 and 20 µm. Thus, a chemical attack, for example with a hydrofluoric acid solution and nitric acid or potassium hydroxide, with the aim of etching the substrate 102 from its rear face 117 will have for consequence a premature destruction of the electronic circuit 106 by the rear face because of the chemical solution(s) which will attack the bottom walls of the second vias 128 and will reach rapidly the electronic circuit 106. The second vias 128 thus form an additional protection with respect to this type of attack. In addition, in the case of attack by FIB etching, the presence of the second vias 128 is penalising, which also forms an additional protection with respect to this type of attack.

In a variant, the second via(s) 128 may correspond to one or more trenches made in a part of the thickness of the substrate 102.

According to a variant of the two embodiments described previously, the pattern of the resistive element 122 in a plane parallel to the rear face 117 of the substrate 102 may correspond to that of a coil. The electronic chip 100 then also comprises an inductive element such as a second coil arranged at the front face of the electronic chip 100, for example integrated in the electronic circuit 106, this second coil being coupled in an inductive manner with that formed by the resistive element 122. The resistive element 122 is produced such that it forms part of a RLC circuit coupled in an inductive manner with said inductive element of the front face. Thus, a modification of an electrical property of the RLC circuit caused by an attack of the electronic chip at its rear face induces a modification of a value of an inductance of the inductive element integrated in the electronic circuit 106 which can thus detect this attack. In this variant, it is not necessary to produce the first vias 124 since communication between the electronic circuit 106 and the resistive element 122 takes place in an inductive manner via the inductive element arranged at the front face of the electronic chip 100. To form the RLC circuit, the resistive element 122 may be produced in the form of a coil of which the ends are electrically connected to each other for example by the electrically conducting layer 119.

According to another embodiment variant, it is possible that the electronic chip 100 does not comprise the continuous electrically conducting layer 119. In this case, the means for protecting the rear face of the electronic chip 100 are formed by the protective layers 120, 126, by the resistive element 122, and potentially by the second vias 128.

In all the embodiments and variants described previously, it is possible that the electronic chip 100 comprises means for protecting its front face, corresponding for example to protection means known from the prior art.

Figure 4A:
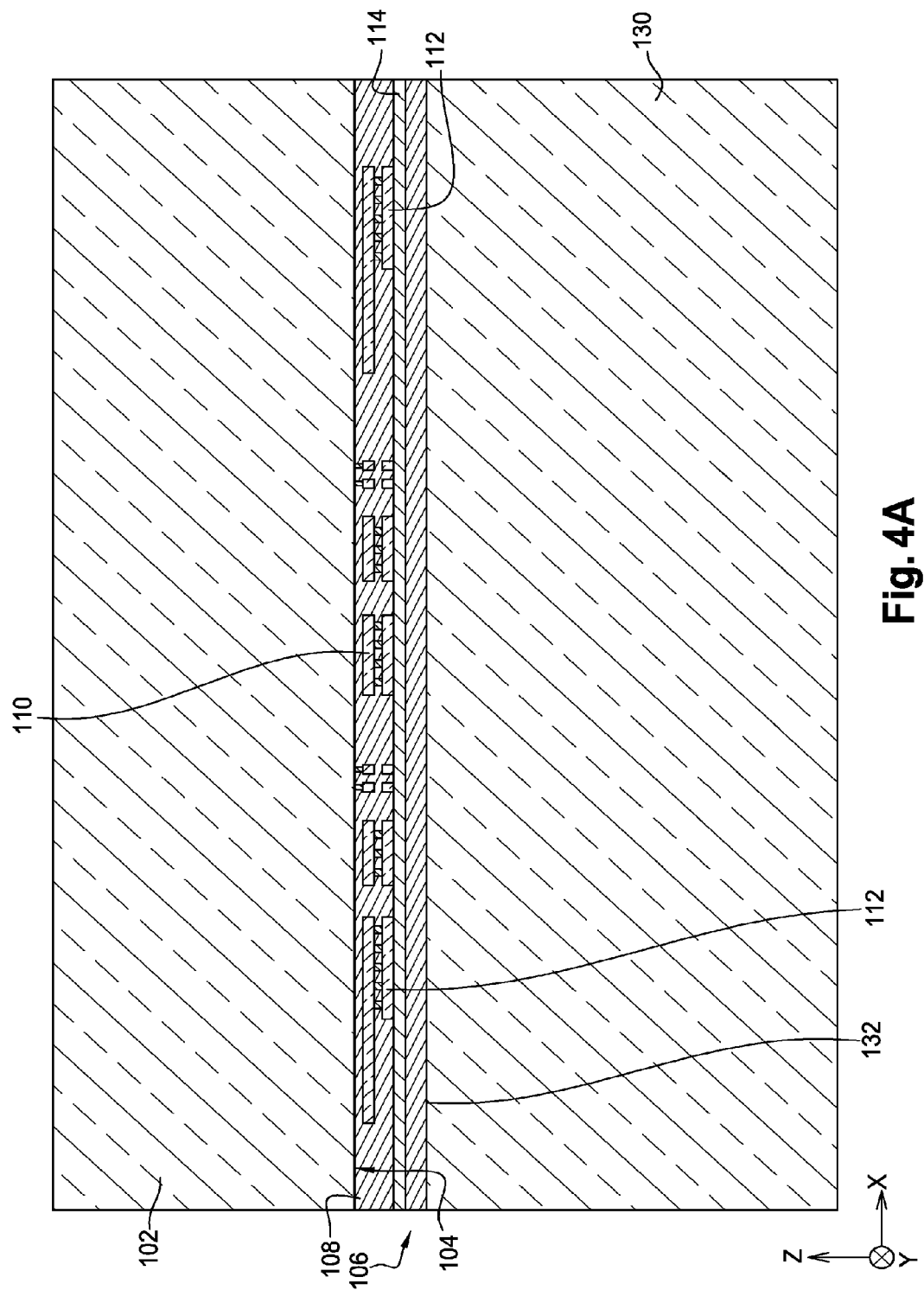
FIGS. 4A to 4N show the steps of a method for producing an electronic chip.
Figure 4B:
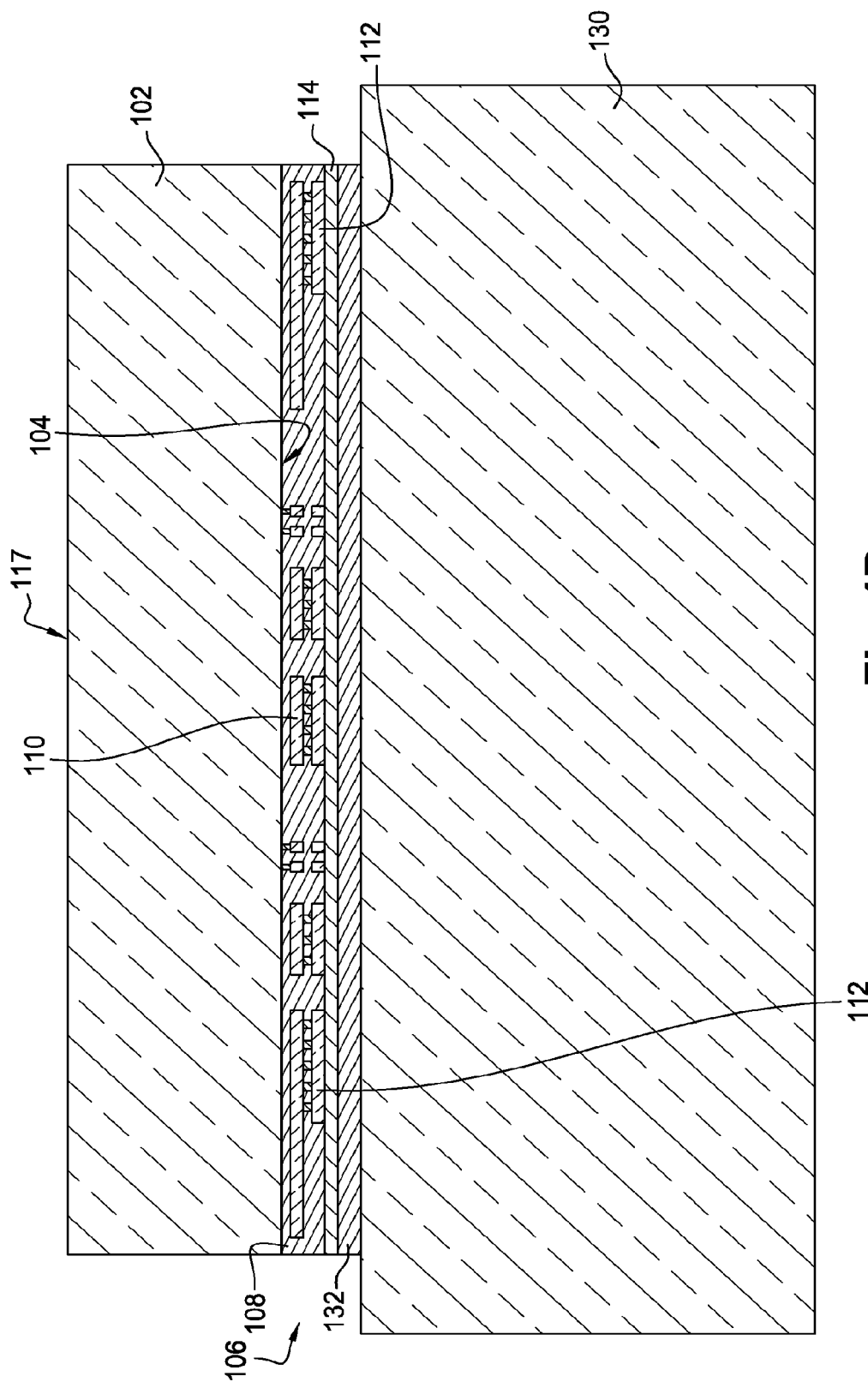
Figure 4C:
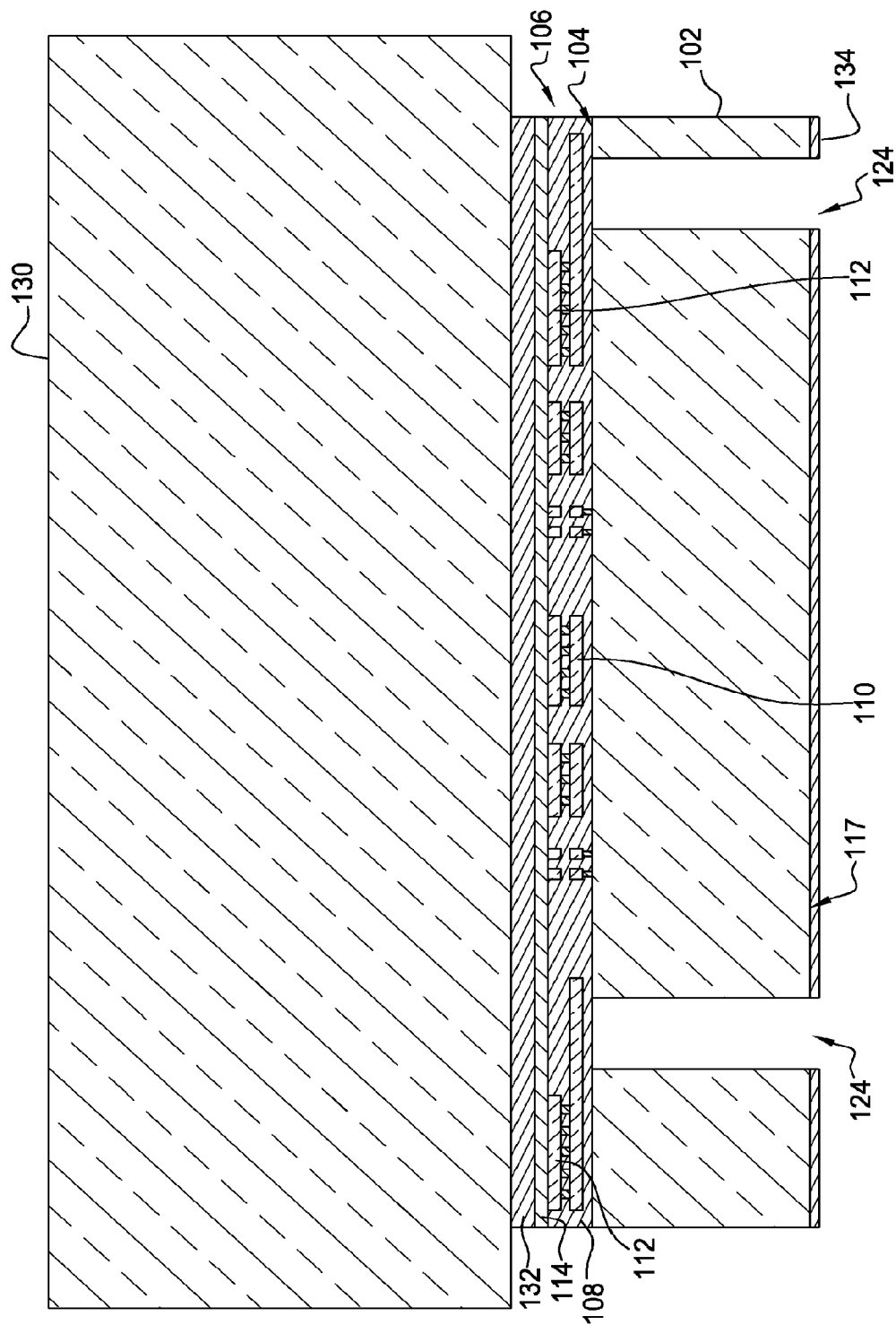
Figure 4D:
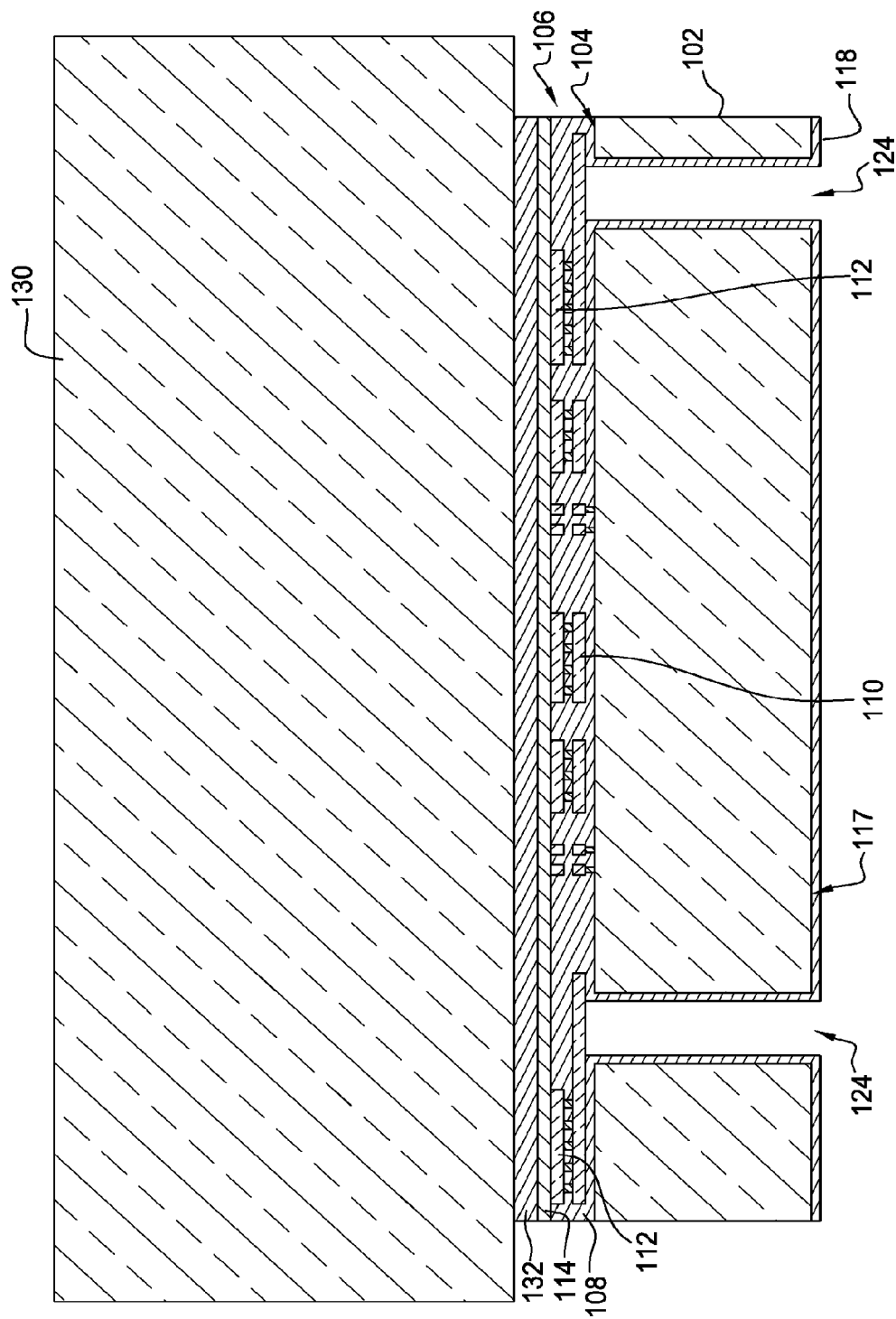
Figure 4E:
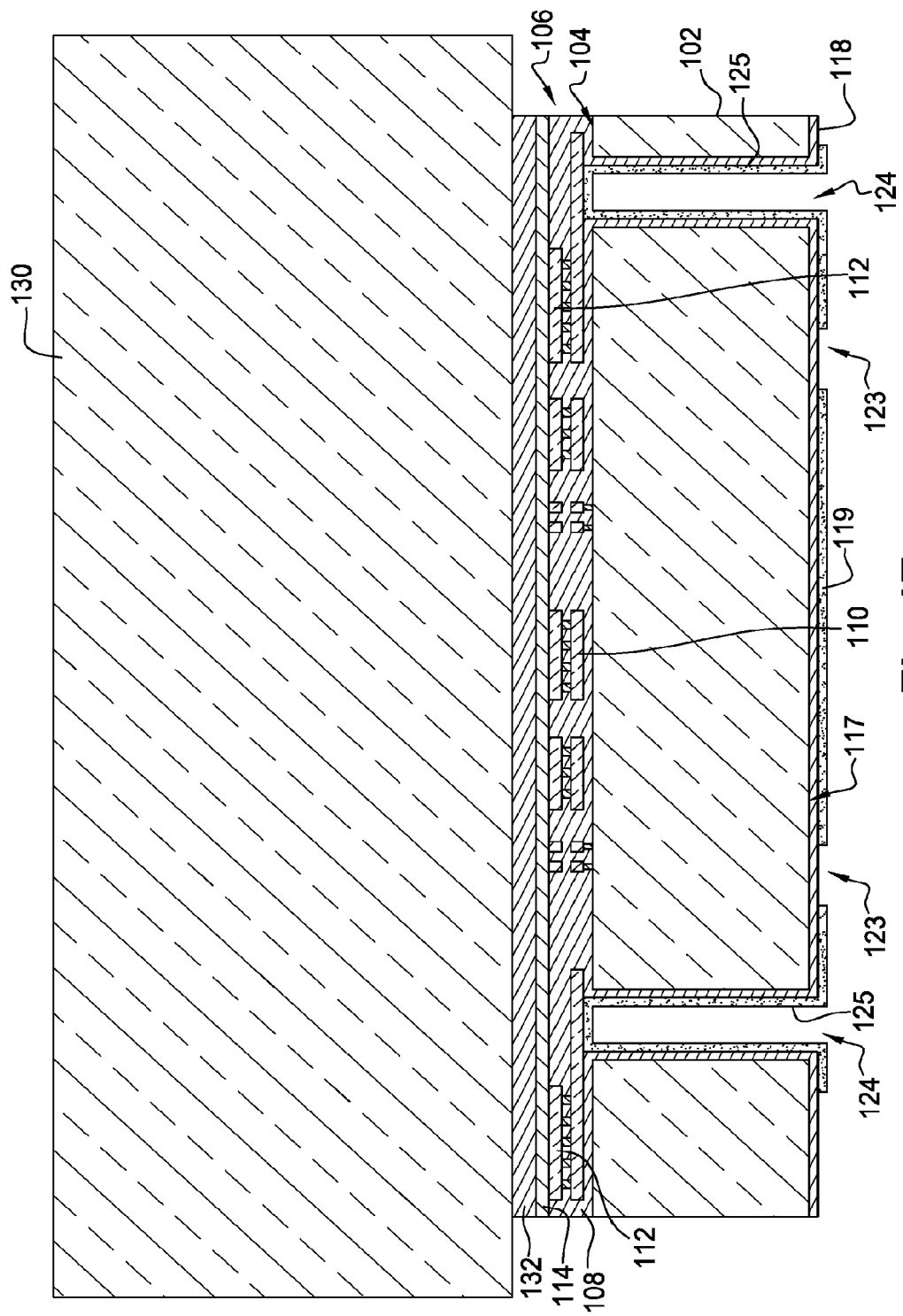
Figure 4F:
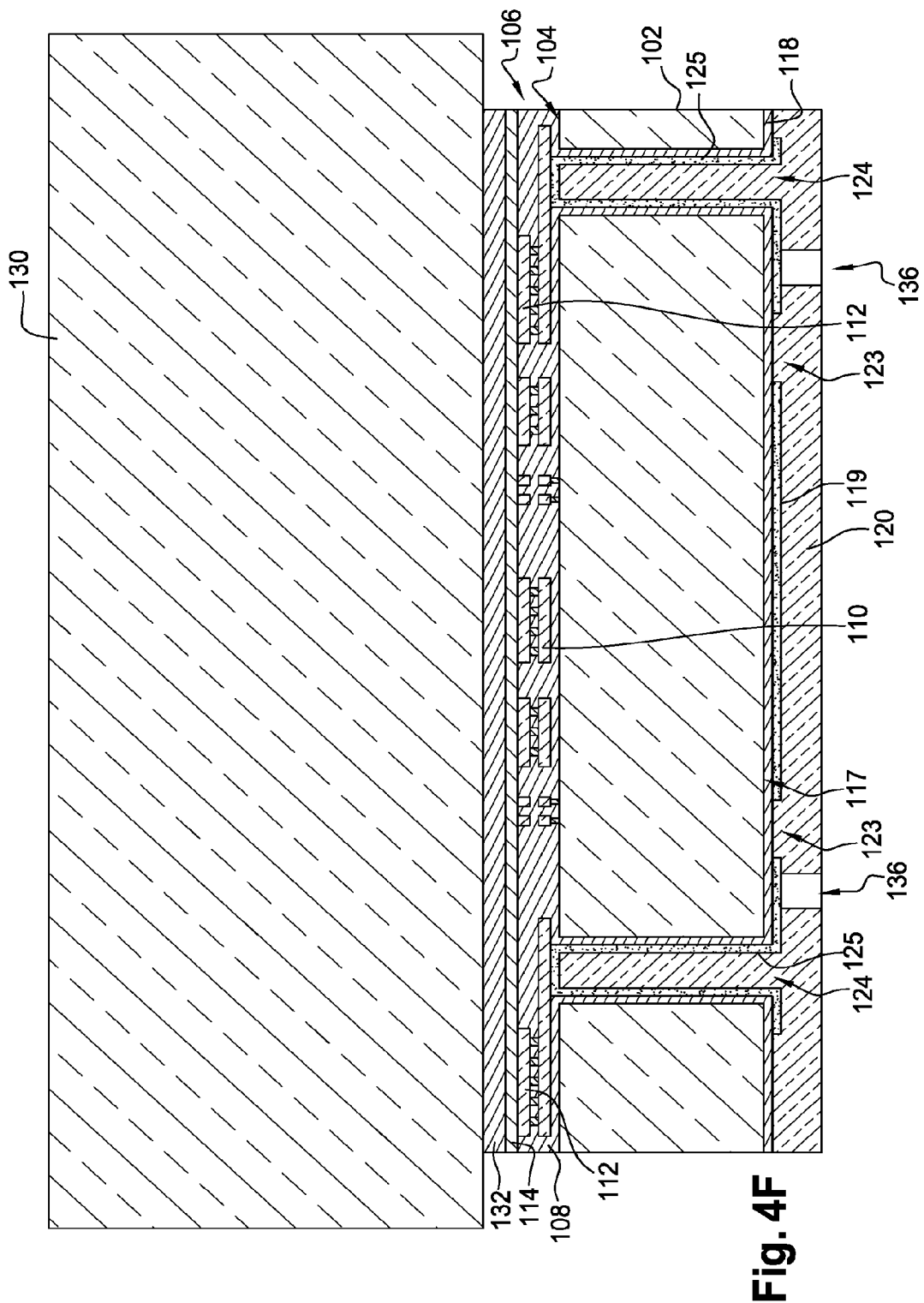
Figure 4G:
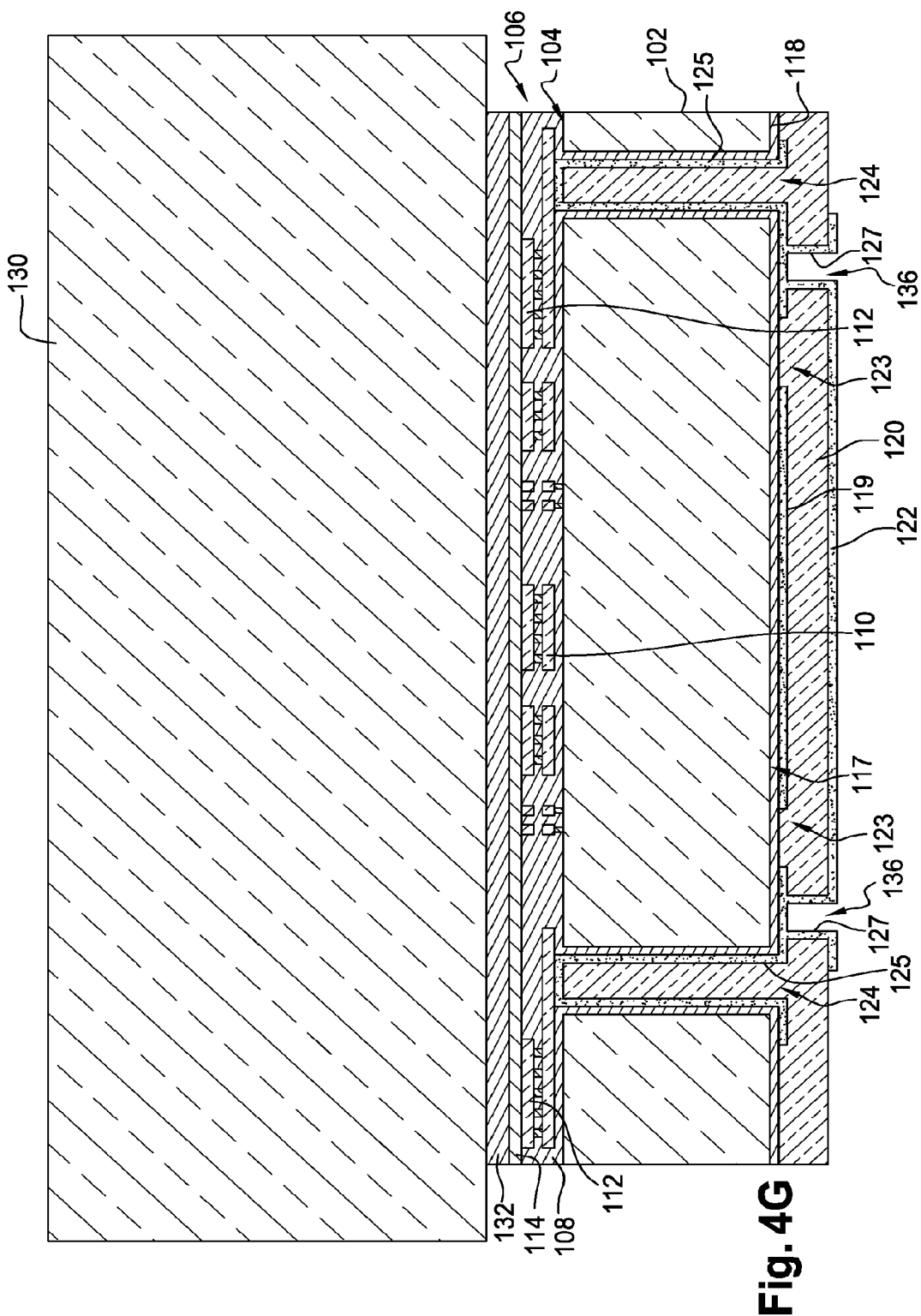
Figure 4H:
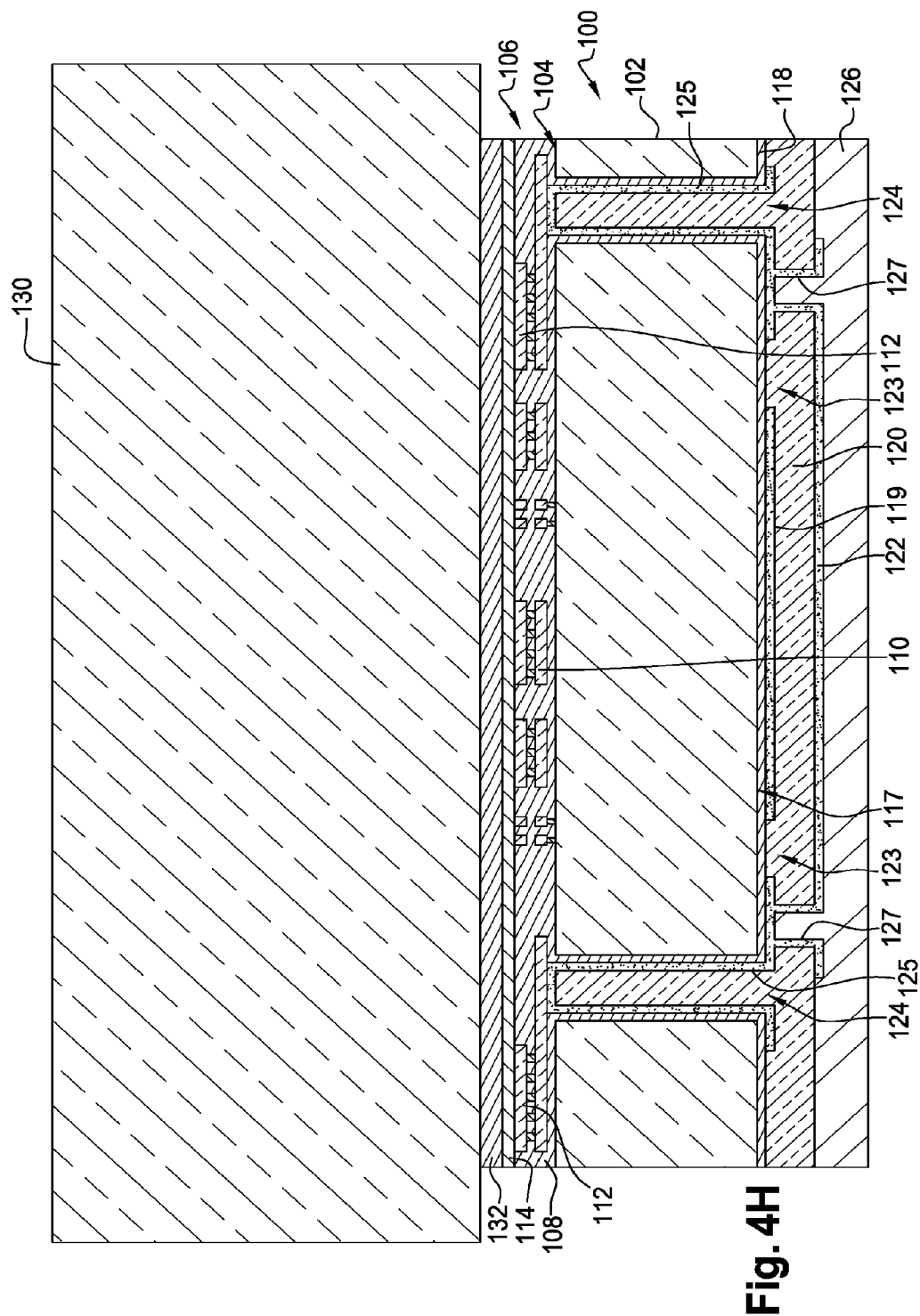
Figure 4I:
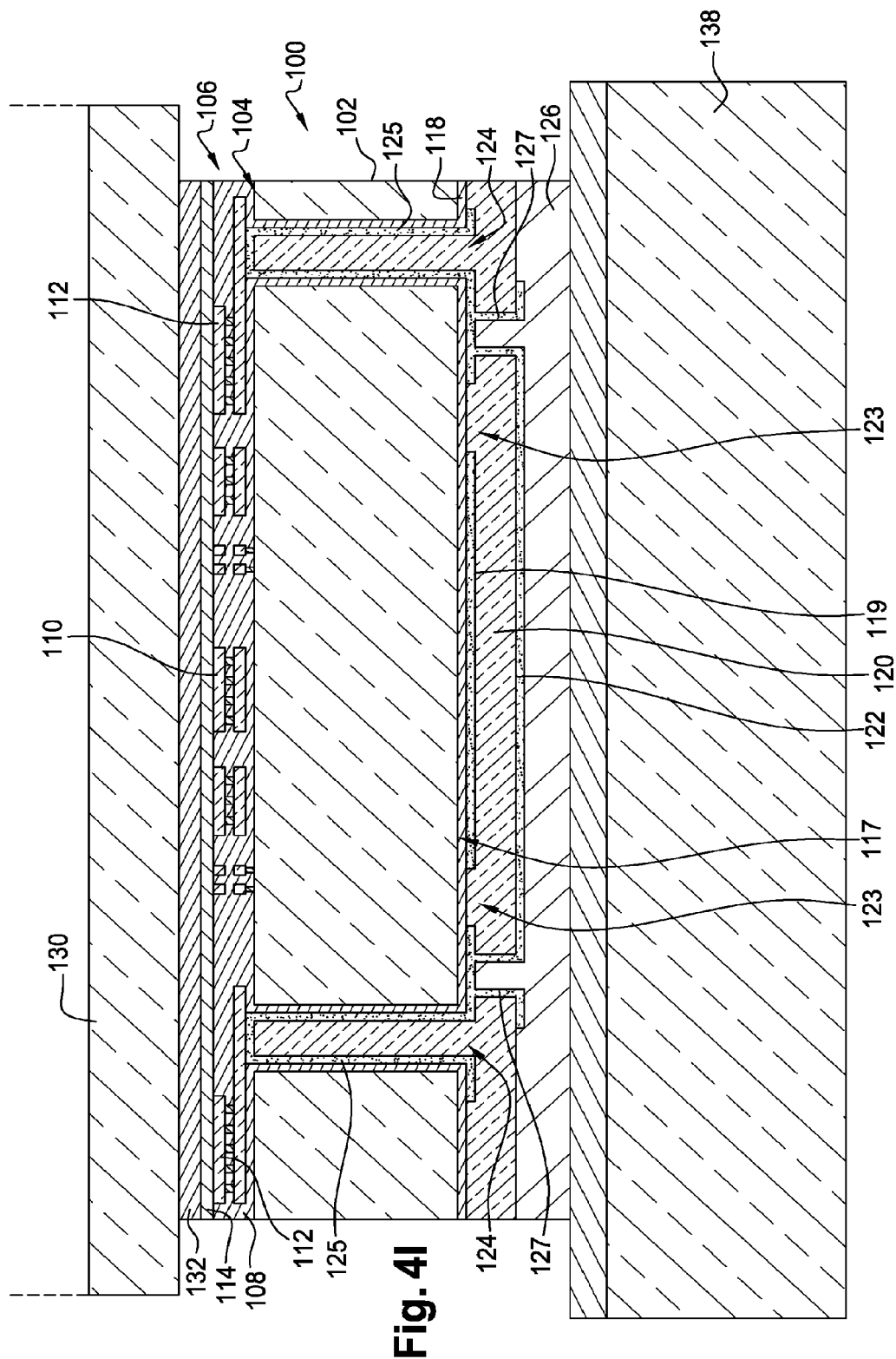
Figure 4J:
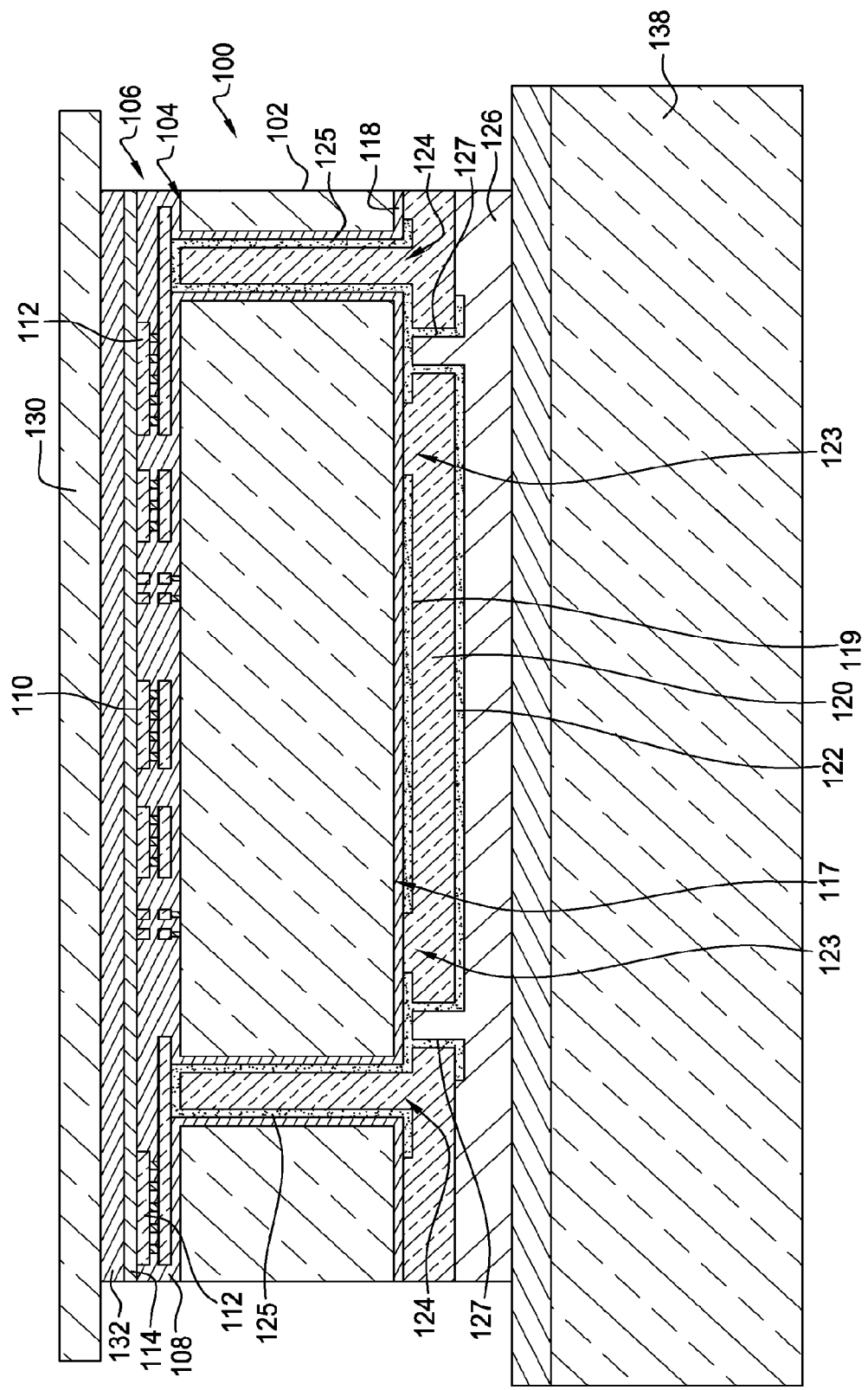
Figure 4L:
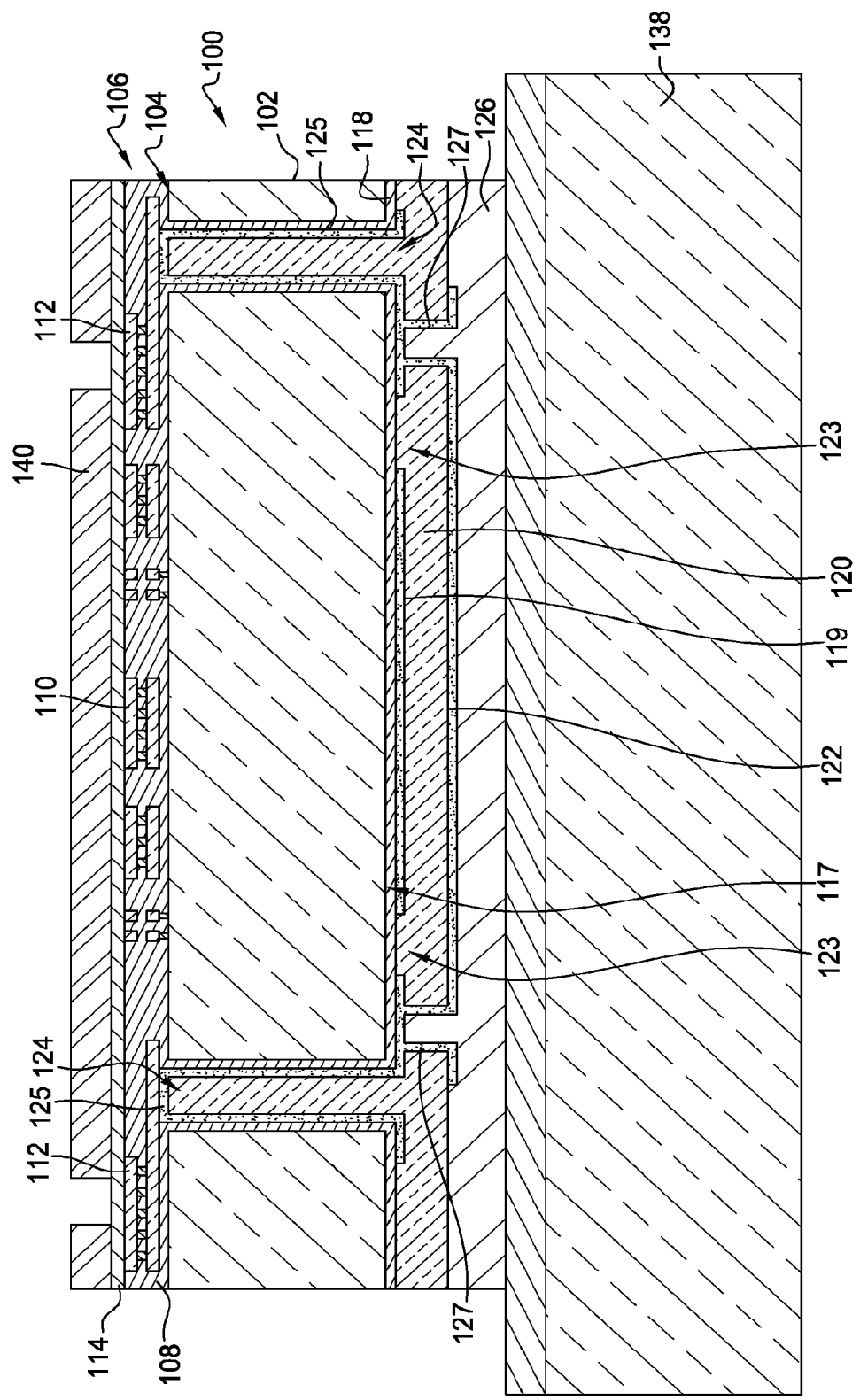
Figure 4M:
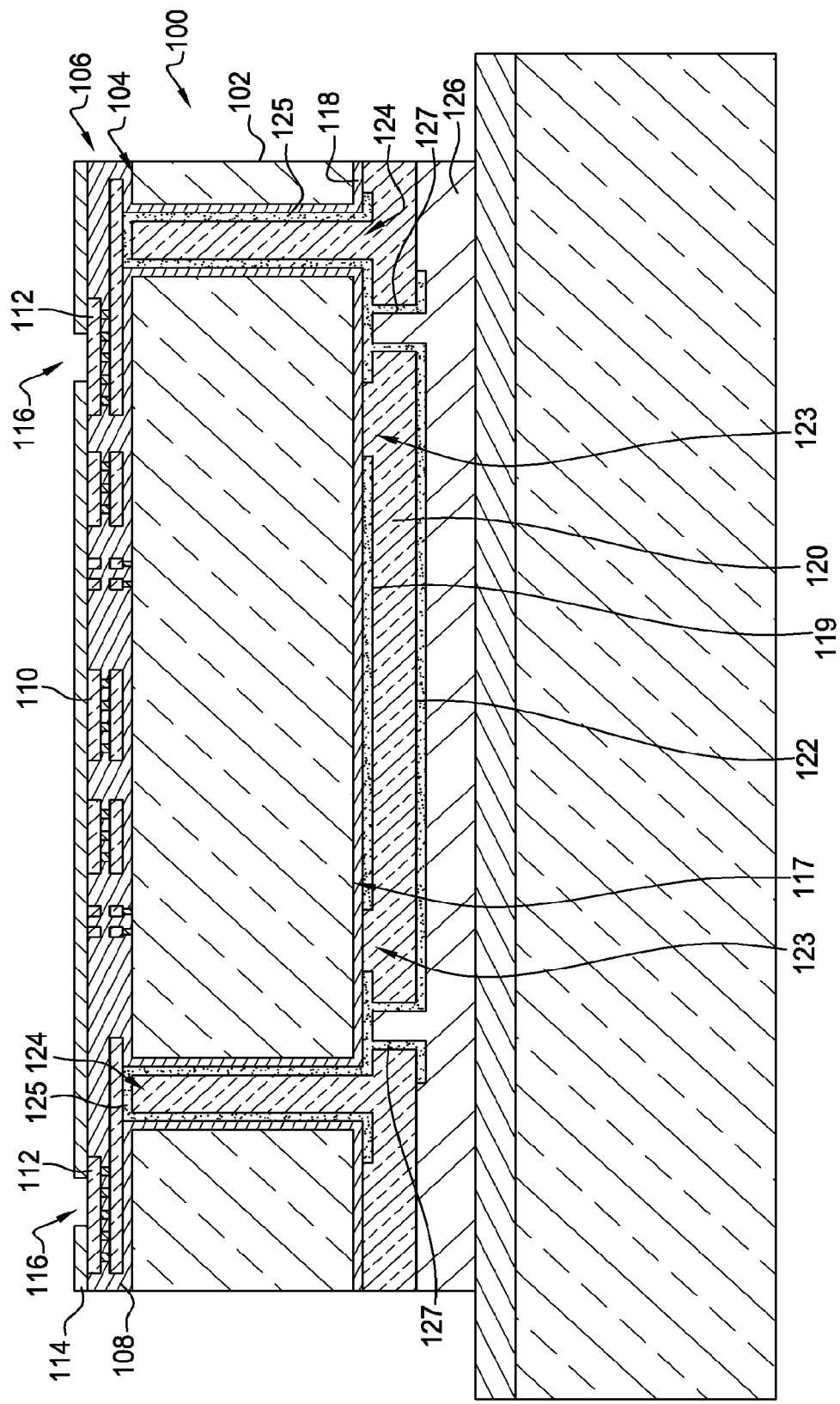
Figure 4N:
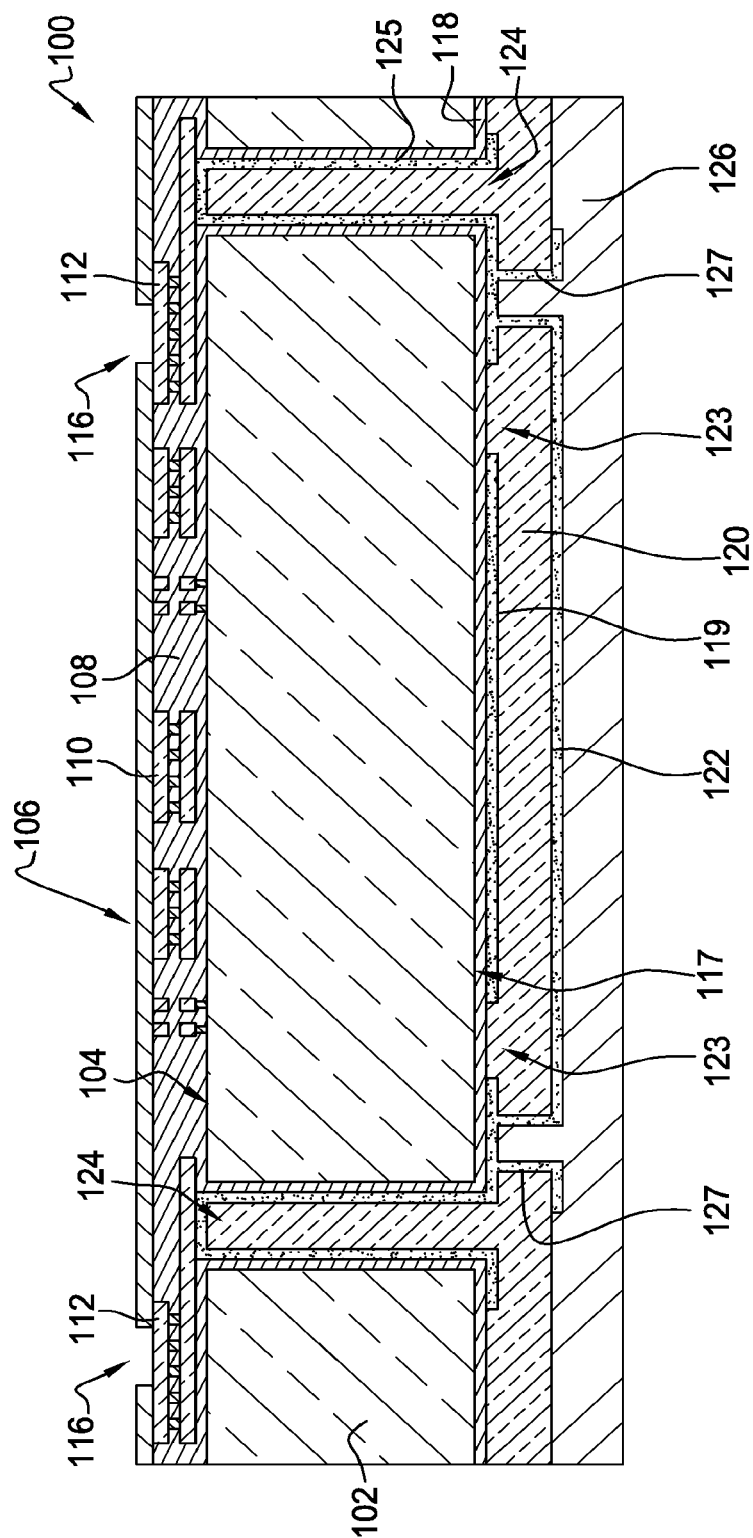

FIGS. 4A to 4N show the steps of a method for producing the electronic chip 100 described previously in relation with FIG. 1.

As shown in FIG. 4A, the electronic circuit 106 is produced at the front face of the substrate 102 via the implementation of conventional microelectronic steps. The electronic circuit 106 is covered by the passivation layer 114 which forms the front face of the electronic chip 100. This front face is made integral with a temporary handle 130 formed for example by a silicon substrate, this bonding being for example produced between the passivation layer 114 which comprises an oxide and another layer of oxide 132 formed beforehand on the temporary handle 130.

The substrate 102 is then thinned from its rear face up to the assembly formed of the substrate 102 and the electronic circuit 106 has a thickness less than or equal to around 200 μm (FIG. 4B).

A hard mask 134, comprising for example an oxide, is then produced on the rear face of the substrate 102. The first vias 124 are then formed through the hard mask 134 and the substrate 102 by lithography, etching of the material of the hard mask 134 and deep etching of the material of the substrate 102 (FIG. 4C). When the electronic chip 100 comprises the second vias 128 as in the example of FIG. 3, the second vias 128 and the first vias 124 may be produced simultaneously via the implementation of common steps of lithography and etching. Openings of which the dimensions and the positioning correspond to those desired for the second vias 128 are thus made through the hard mask 134.

As shown in FIG. 4D, the dielectric layer 118 is then deposited, for example by PECVD or SACVD (sub-atmospheric chemical vapour deposition), such that it covers the hard mask 134 arranged on the rear face of the substrate 102, as well as the lateral walls and the bottom walls of the first vias 124 (and potentially the second vias 128). The parts of the dielectric layer 118 deposited on the bottom walls of the first vias 124 are then eliminated in order that electrical contacts can be produced later through these first vias 124.

The electrically conducting layers 119 and 125 are then produced for example by the implementation of the following steps:

deposition of a diffusion barrier layer, comprising for example a Ti/TiN bilayer (Ti deposited for example by PVD and TiN deposited for example by MOCVD, or metalorganic chemical vapour deposition), on the dielectric layer 118 as well as at the bottom walls of the first vias 124 (and potentially also on the lateral walls and the bottom walls of the second vias 128);

deposition of a growth layer, for example comprising copper, on the barrier layer;

lithography of a dry film (of positive or negative resin type) so as to define electrical insulation regions between the layers 119 and 125) and electrolytic growth, for example of copper, from the growth layer;

removal of the dry film, then etching of the parts of the growth layer and the barrier layer at the insulation regions 123 between the layers 119 and 125.

The structure obtained at this stage of the method is shown in FIG. 4E.

The first protective layer 120 is then deposited, for example by vacuum lamination, on the whole of the rear face of the structure obtained previously, that is to say on the electrically conducting layers 119 and 125, as well as at the insulation regions 123 between the layers 119 and 125. The material of the first protective layer 120 is deposited such that it fills the first vias 124 (and potentially the second vias 128). Then, the first protective layer 120 is etched (or photo-defined if this layer comprises a photosensitive material) in order to form openings 136 emerging on the conducting layer 125 at each of the first vias 124, these openings 136 forming the emplacements for the conducting portions 127 intended to be produced later (FIG. 4F).

As shown in FIG. 4G, the resistive element 122 as well as the conducting portions 127 are then produced for example by the implementation of the following steps:

deposition of a diffusion barrier layer, comprising for example a Ti/TiN bilayer, on the first protective layer 120 and in the openings 136;

deposition of a growth layer, for example comprising copper, on the barrier layer;

lithography of a dry film of which the pattern (that is to say the places where the resin is removed) corresponds to the regions occupied by the resistive element 122 and the conducting portions 127) and electrolytic growth, for example of copper, from the growth layer;

removal of the dry film, then etching of the parts of the growth layer and the barrier layer at the regions not occupied by the resistive element 122 and the conducting portions 127.

The second protective layer 126 is then deposited, for example via the implementation of a deposition by spin coating or by lamination, thus encapsulating the resistive element 122 between the two protective layers 120, 126 (FIG. 4H). The second protective layer 126 also covers the conducting portions 127 as well as some parts of the first protective layer 120.

The temporary handle 130 is then removed. To do so, the steps below are for example implemented:
- a temporary support 138 comprising for example a polymer is made integral with the second protective layer 126 of the chip 100 (FIG. 4I);
- the temporary handle 130 is then thinned, for example by grinding (FIG. 4J), then is completely removed (FIG. 4K).

The openings 116 are then produced through the passivation layer 114, for example by deposition of a lithography mask 140 (FIG. 4L) and etching (FIG. 4M), in order to form accesses to the contact pads 112.

Finally, the temporary support 138 is removed (FIG. 4N).

The invention claimed is:

1. An electronic chip comprising at least:
an electronic circuit arranged at a front face of a substrate;
a first protective layer arranged on a rear face of the substrate;
a resistive element arranged on the first protective layer and facing at least one part of the electronic circuit, mechanically supported by the first protective layer and connected electrically and/or in an inductive manner to the electronic circuit;
a second protective layer disposed beneath the rear face of the substrate without being disposed over the front face of the substrate and covering at least the resistive element;
and in which the first protective layer comprises at least one dielectric material having a resistance to chemical etching by at least one chemical etching agent less than or equal to that of a dielectric material of the second protective layer.

2. The electronic chip according to claim 1, in which at least the dielectric material of the second protective layer comprises at least one of the following characteristics: resistant to mechanical polishing, opaque towards infrared radiation, and resistant to an attack by focused ion beam.

3. The electronic chip according to claim 2, in which at least the dielectric material of the second protective layer has a Young's modulus greater than or equal to around 1 GPa.

4. The electronic chip according to claim 1, in which the dielectric material of the first protective layer and/or the dielectric material of the second protective layer is a non-mineral material and/or a polymer and/or comprises epoxy and/or comprises silicone.

5. The electronic chip according to claim 1, in which the first protective layer and/or the second protective layer further comprises particles of a first material different to the dielectric material of the first protective layer and/or the dielectric material of the second protective layer, and which are spread out in the whole of the dielectric material of the first protective layer and/or the dielectric material of the second protective layer.

6. The electronic chip according to claim 5, in which the first material of the particles comprises at least one of silica and alumina.

7. The electronic chip according to claim 5, in which the first material of the particles is covered with a second reflective material towards light and/or electronic and/or ionic radiation.

8. The electronic chip according to claim 1, in which the resistive element comprises at least one conducting track having at least one serpentine pattern and/or several alternating, entangled, wound up or intertwined patterns.

9. The electronic chip according to claim 8, in which the conducting track has a width comprised between around 5 μm and 50 μm, and/or in which the portions of the conducting track which are next to and parallel to each other are spaced apart by a distance comprised between around 5 μm and 50 μm.

10. The electronic chip according to claim 1, further comprising an electrically conducting layer arranged between the rear face of the substrate and the first protective layer.

11. The electronic chip according to claim 1, further comprising at least two first conducting vias made through the substrate and electrically connecting the resistive element to the electronic circuit.

12. The electronic chip according to claim 1, further comprising an inductive element arranged at the front face of the substrate and electrically connected to the electronic circuit, and in which the resistive element forms part of a RLC (resistor, inductor, and capacitor) circuit capable of being coupled in an inductive manner with said inductive element such that a modification of a value of an inductance of the inductive element induces a modification of an electrical property of the RLC circuit.

13. The electronic chip according to claim 12, in which the inductive element is integrated in the electronic circuit.

14. The electronic chip according to claim 12, in which the resistive element forms a coil of which the ends are electrically connected to each other.

15. The electronic chip according to claim 1, further comprising at least one second via and/or a trench made through the rear face of the substrate and only a part of the thickness of the substrate, and arranged at least facing the electronic circuit such that a bottom wall of the second via and/or of the trench is spaced apart from the electronic circuit by a non-zero distance.

16. A method for producing an electronic chip comprising at least the steps of:
producing an electronic circuit at a front face of a substrate;
producing a first protective layer on a rear face of the substrate;
producing at least one resistive element on the first protective layer and facing at least one part of the electronic circuit, the resistive element being mechanically supported by the first protective layer and connected electrically and/or in an inductive manner to the electronic circuit;
producing a second protective layer disposed beneath the rear face of the substrate without being disposed over the front face of the substrate and covering at least the resistive element;
and in which the first protective layer comprises at least one dielectric material having a resistance to chemical etching by at least one chemical etching agent less than or equal to that of a dielectric material of the second protective layer.

\* \* \* \* \*